UNITED STATES PATENT OFFICE.

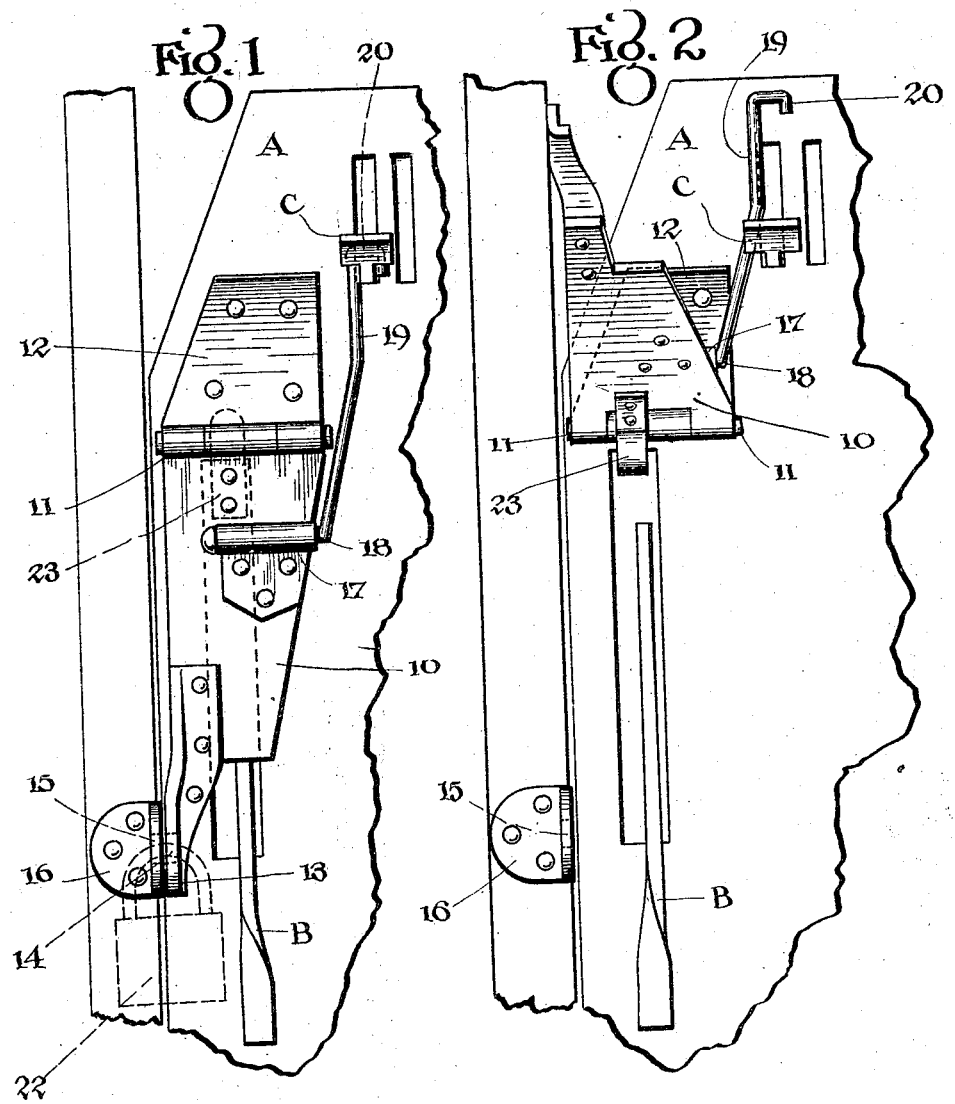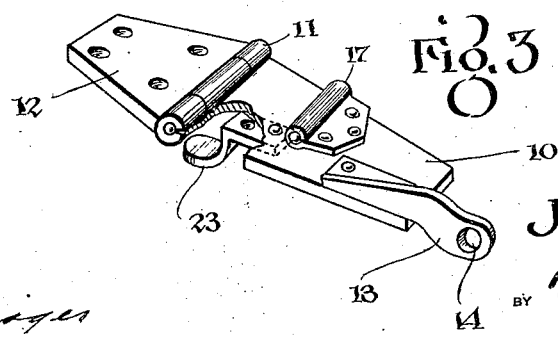

JOHN KLASNICH, OF UNIVERSAL, INDIANA.

LOCK FOR MOTOR VEHICLES.

1,419,861. Specification of Letters Patent. Patented June 13, 1922.

Application filed July 30, 1920. Serial No. 400,060.

*To all whom it may concern:*

Be it known that I, JOHN KLASNICH, a citizen of United States, residing at Universal, in the county of Vermilion and State of Indiana, have invented new and useful Improvements in Locks for Motor Vehicles, of which the following is a specification.

This invention comprehends the provision of an automobile locking device, primarily designed for use in conjunction with Ford automobiles.

The invention embodies amongst other features, means for locking the brake control lever in an active position, as well as holding the clutch pedal in neutral position, the invention being simple in construction, and one which can be applied to a machine without altering the latter.

The nature and advantages of the invention will be better understood when the following detail description is read in connection with the accompanying drawings, the invention residing in the construction, combination and arrangement of parts as claimed.

In the drawing forming part of this application like numerals of reference indicate similar parts in the several views and wherein:

Figure 1 is a plan view of an automobile floor board showing the invention associated therewith for use.

Figure 2 is similar view showing the normal or inactive position of the locking device.

Figure 3 is a perspective view of the hinged plate or member.

Referring to the drawing in detail A indicates the floor board section, B, the brake control lever, and C the clutch control pedal. The locking device forming the subject matter of my invention embodies a plate 10 which is hingedly secured as at 11 to the attaching member 12 which is secured to one of the floor sections as shown. The plate is formed with a reduced extension 13 which is bent to lie at a right angle to the plate proper, and having an opening 14 which when the plate is in an active position registers with an opening 15 in a keeper 16 secured to the frame of the car, or some other fixed part. The plate 10 is arranged to partly cover the slot in the floor board in which the brake control lever B operates. A bearing 17 is carried by the plate 10 to accommodate the angular extremity 18 and a hook like element 19, the hook 20 of which is arranged to embrace the shank of the clutch control pedal C. The connection between the hook-like element and the plate permits a slight pivotal movement of the hook like element so that the latter may readily and easily assume the position shown in Figure 2 when the plate 10 is moved to an inactive position.

In practice, when it is desired to lock the car against theft, or its use by unauthorized persons, the plate 10 is swung to a horizontal position overlying the slot in which the lever B operates. The lever B is of course moved to the position as shown in Figure 1 which is its active position, and at which time the brakes are of course applied. When the plate 10 is swung to this position, the hook like element 19 is moved rearwardly engaging the pedal C and holding the latter against movement in its neutral position. When the parts are thus disposed, a padlock or the like indicated at 22 secures the plate immovably associated with the keeper 16. Manifestly, in addition to the brakes being applied, movement of the pedal C is prohibited when the parts are positioned in the manner shown in Figure 1. The locking device is extremely simple in construction and can be manufactured and sold at a nominal cost.

The plate 10 is further provided with a hook like element 23 which is secured to the underside of the plate adjacent its hinged connection, so that when the plate is moved to an active position this hook like element 23 passes through the slot in which the brake control lever operates and bears against the underside of one of the sections of the flood board. This hook prevents the locking device in its entirety being separated from the floor board section.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

1. An automobile locking device comprising a pivoted member attached to the floor board of the car and adapted to overlie the brake control lever when the latter is in an active position, means for locking said member to a fixed part of the car, an element designed to engage the clutch control pedal to prevent movement of the latter, said element being pivoted on said member and associated with the latter for movement simultaneously therewith to an active or inactive position.

2. An automobile locking device comprising a member hingedly mounted upon the floor board of the car for vertical swinging movement and adapted to overlie the brake control lever when the latter is in an active position, an apertured keeper secured to a fixed part of the car, an extension formed on said member and angularly disposed with respect thereto, said extension having an opening adapted to register with the aperture of said keeper to accommodate the padlock or the like, and a pedal engaging element pivotally associated with said member and movable therewith to an active or inactive position.

3. An automobile locking device comprising a member hingedly mounted on the floor boards of the car, adapted to overlie a slot therein provided for the brake control lever, a pedal engaging element associated with said member and movable therewith to an active or inactive position, means for locking said member in an active position to a fixed part of the car, and a hook like element carried by said member and operating through said slot to engage the underside of the floor board for the purpose specified.

In testimony whereof I affix my signature.

JOHN KLASNICH.